United States Patent [19]

Mark et al.

[11] 4,349,658

[45] Sep. 14, 1982

[54] FLAME RETARDANT AROMATIC POLYESTER-CARBONATE COPOLYMER COMPOSITIONS

[75] Inventors: Victor Mark, Evansville; Charles V. Hedges, Mount Vernon, both of Ind.

[73] Assignee: General Electric Company, Mount Vernon, Ind.

[21] Appl. No.: 221,937

[22] Filed: Dec. 31, 1980

[51] Int. Cl.$^3$ .................................................. C08G 63/64
[52] U.S. Cl. ................................... 528/176; 525/439; 528/128; 528/173; 528/191
[58] Field of Search ............... 528/176, 128, 173, 191; 525/439

[56] References Cited

U.S. PATENT DOCUMENTS

| | | | |
|---|---|---|---|
| 3,388,097 | 6/1968 | Cramer | 528/191 |
| 4,220,583 | 9/1980 | Mark | 528/191 |
| 4,273,899 | 6/1981 | Saiki et al. | 525/439 |
| 4,283,523 | 8/1981 | Salee et al. | 528/176 |

*Primary Examiner*—Lucille M. Phynes
*Attorney, Agent, or Firm*—Martin B. Barancik; William F. Mufatti

[57] ABSTRACT

Polyester-carbonate copolymers, blends of polyesters with polyester-carbonate copolymers and block copolymer compositions of polyester-carbonate copolymers have improved flame retardance when portions of the copolymer contain fluorinated diphenol copolymer. The fluorinated diphenol has at least one fluorinated alkyl or fluorinated aryl group upon the methylene carbon atom positioned between the aromatic ring structures of the diphenol. Polyester-carbonate copolymers, the blends of polyesters with the polyester-carbonate copolymers and block polymer compositions of polyester-carbonate copolymers are flame retardant.

20 Claims, No Drawings

FLAME RETARDANT AROMATIC POLYESTER-CARBONATE COPOLYMER COMPOSITIONS

This invention relates to polyester-carbonate copolymer compositions, and more particularly, relates to polyester-carbonate copolymer compositions containing monomeric units of fluorinated diphenols.

BACKGROUND OF THE INVENTION

Copolyester-carbonates and the methods for preparing them are well-known in the prior art. Products made from copolyester-carbonates exhibit such properties as high impact strength, toughness, high transparency, wide temperature stability limits, good dimensional stability, good creep resistance and the like. Copolyester-carbonates can be formed into articles of various shapes including thin films. It is also desirable to provide copolyester-carbonates having improved flame-retardance so that thin films and other products made from such copolyester-carbonates, can be safely used by the consumer and also meet the increasing requirements of certain flame retardant criteria being established by local and federal government agencies as well as the manufacturers of such products.

Among the copolyester-carbonates and the methods for preparing them which are well-known in the prior art, are those disclosed in U.S. Pat. Nos. 3,030,331; 3,169,121; and 3,207,814. U.S. Pat. No. 4,189,549 discloses polyester-carbonate copolymer compositions which are obtained from a melt polymerization process employing para-hydroxy benzoic acid. U.S. Pat. No. 4,156,069 discloses a process for preparing an alternating ester-carbonate block copolymer from dihydric phenols, dicarboxylic acid, dihalides, phosgene and a molecular weight regulator in the presence of pyridine. A typical copolyester-carbonate obtained therein consists of bisphenol-A, terephthalate and carbonate moieties having mole ratios from 2:0.8:1.2 to 2:1.3:0.7.

In U.S. Pat. No. 3,388,097, 4,4'-(1,1,1-trifluoroethylidene)diphenol was made from trifluoroacetaldehyde hydrate and phenol in the presence of anhydrous hydrogen fluoride in a pressure bomb. The product was distilled under reduced pressure at 165°–170° C. and 0.5–0.6 mm. Hg. Polyesters are made from these perhaloalkyl bisphenols and specified aromatic acid halides. However, it is noted that the acid catalyst is pressurized anhydrous hydrogen fluoride, and that the reaction product had to be distilled at 165°–170° C. at reduced pressure. The bisphenols which are useful in the preparation of the polyesters in U.S. Pat. No. 3,388,097 have the structure:

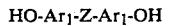
HO-Ar₁-Z-Ar₁-OH (1)

wherein Ar₁ is para-phenylene, and Z is a divalent radical having the formula:

(2)

wherein R and R' may be the same or different and represent perhalogenated lower alkyl groups, fluorine and chlorine being the preferred halogen species, with the provision that R' may represent hydrogen when R represents a perfluorinated lower alkyl group. These bisphenols are prepared under pressure by the acid catalyzed condensation of an appropriate halogenated ketone or aldehyde with two molecules of an appropriate phenol. However, there is no suggestion of high molecular weight polyester-carbonates or of the possibility of flame retardance of certain polyester-carbonates derived from fluorinated diphenols.

In U.S. Pat. No. 4,220,583, flame retardancy of polycarbonate compositions was improved by admixing a halogen-free aromatic polycarbonate and minor amounts of partially fluorinated polyolefin and minor amounts of an organic alkali metal salt or an organic alkaline earth salt, or mixtures thereof. Although these polycarbonate compositions containing flame retardant organic salts exhibit good flame retardancy, it is always desirable to achieve flame retardancy without resorting to additives.

In general, the prior art references recognize that flame retardance can be imparted to polycarbonates by chlorinating or brominating the monomeric building blocks from which they are obtained. None of these references, however, discloses or suggests that a high molecular weight polyester-carbonate copolymer composition having improved flame retardance can be obtained from the fluorinated diphenols.

SUMMARY OF THE INVENTION

Accordingly, it is the primary object of the present invention to provide polyester-carbonate copolymer compositions having improved flame retardance.

It is another object of this invention to provide polyester-carbonate copolymer compositions wherein the bisphenol-carbonate units have fluorinated alkyl side chains.

Still another object of this invention is to provide polyester-carbonate copolymers which can be blended with other polymers to improve the flame retardance of said polymers.

It has now been found that high molecular weight polyester-carbonate copolymer compositions of matter have improved flame resistance when the composition comprises bisphenol ester units (moieties) and bisphenol-carbonate units (moieties), said bisphenol-carbonate units (moieties) having the general formula:

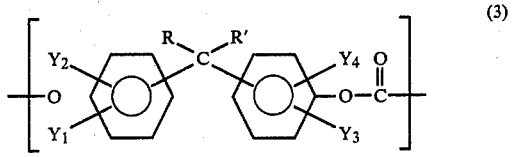
(3)

wherein R is a radical selected from the group consisting of a fluorinated alkyl radical and a fluorinated aryl radical; R' is selected from the group consisting of fluorinated alkyl radical, fluorinated aryl radical, alkyl radical and hydrogen; and Y₁, Y₂, Y₃ and Y₄ are each independently selected from the group consisting of hydrogen, alkyl radical, chlorine and bromine. As used herein, Y₁, Y₂, Y₃ and Y₄ can be the same or different or can be mixtures of hydrogen, alkyl, chlorine or bromine. In accordance with the present invention, R must be a fluorinated alkyl radical, preferably having from 1 to about 22 carbon atoms, and R may be a straight chain or a branched fluorinated alkyl radical, or R must be a fluorinated aryl radical, preferably having from 6 to about 16 carbon atoms. When R' is a fluorinated alkyl radical, the alkyl radical is preferably 1 to about 22 carbon atoms; when R' is a fluorinated aryl radical, the aryl radical is preferably 6 to about 16 carbon atoms; and when R' is an alkyl radical, the alkyl radical is preferably 1 to about 22 carbon atoms. In certain preferred embodiments, R and/or R' are perfluorinated alkyl or aryl radicals.

The bisphenol ester units in the polyester-carbonate copolymer composition of matter of the present invention may be derived from any difunctional monomer. The preferred bisphenol ester units are aromatic ester units, and in certain embodiments of the present invention, the ester units have the general formula:

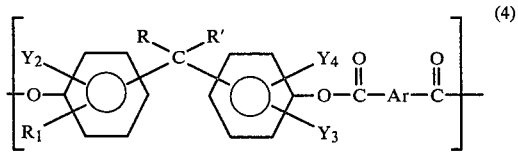

wherein R, R', $Y_1$, $Y_2$, $Y_3$ and $Y_4$ are the same as defined above, and wherein Ar is selected from the group consisting of metaphenylene, meta-phenylene having halogen or monovalent lower alkyl groups thereon, para-phenylene and para-phenylene having halogen or monovalent lower alkyl groups thereon, wherein the halogen can be chlorine, bromine or fluorine, and the lower alkyl groups typically have from 1 to about 4 carbon atoms. In preferred embodiments, Ar in formula (4) is

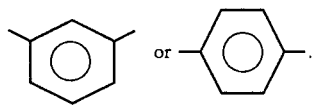

The particular method by which the polyester-carbonate copolymer compositions of the present invention are prepared depends upon the type of copolyester-carbonate desired. Generally speaking, the compositions of the invention are prepared by reacting a diphenol having a fluorinated alkyl radical or a fluorinated aryl radical attached to the central carbon atom, otherwise described herein as the methylene carbon atom positioned between the two benzene rings of a bisphenol compound, said fluorinated diphenol having the formula:

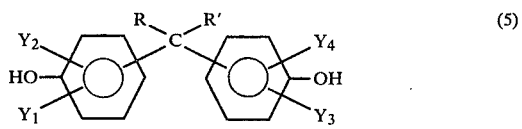

wherein R, R', $Y_1$, $Y_2$, $Y_3$ and $Y_4$ are the same as defined above. As used herein, fluorinated diphenol is the fluorinated diphenol of formula (5) with at least one fluorinated alkyl radical or fluorinated aryl radical upon the methylene of central carbon atom positioned between the phenol ring structures. The fluorinated diphenol of formula (5) is reacted with a carbonate precursor, such as, for example, phosgene, and a difunctional monomer which may be an aromatic dicarboxylic acid and substituted derivatives thereof, or a dicarboxylic acid dihalide or diester and the like. The methods of polymerization include solution polymerization, interfacial polymerization, transesterification, and the like, and other conventional polymerization methods as defined in the prior art.

The polyester-carbonate copolymers of the present invention have flame retardance regardless of the polymeric sequence which includes random copolymers, alternating copolymers, block copolymers, and the like. Furthermore, the present invention also embraces blends of the polyester-carbonate copolymer compositions having the aromatic polycarbonate units based upon the bisphenol monomer having a methylene carbon atom substituted with at least one fluorinated alkyl group or at least one fluorinated aryl group. Blends with other polyester-carbonates, blends with polyarylates, for example, polyesters, blends with polycarbonates, and the like, are embraced by the present invention.

DESCRIPTION OF THE PREFERRED EMBODIMENTS

In the present invention, improved flame retardance is imparted to high molecular weight, polyester-carbonate copolymers by selecting or preparing appropriate fluorinated diphenols to be used with a carbonate precursor and a difunctional acid monomer in the polymerization reaction. This is achieved by providing at least one fluorinated alkyl radical or fluorinated aryl radical upon the methylene carbon atom positioned between the phenol rings of bis(hydroxyphenyl)methane. In preferred embodiments, the fluorinated alkyl group represented by R and/or R' is from 1 to about 22 carbon atoms and may be partially fluorinated or completely fluorinated (perfluorinated alkyl group). In other preferred embodiments, the fluorinated aryl group represented by R and/or R' is from 6 to about 16 carbon atoms and may be partially fluorinated or completely fluorinated (perfluorinated alkyl group). In still other preferred embodiments R' may be hydrogen or alkyl having from 1 to about 22 carbon atoms and more preferably from 1 to about 6 carbon atoms. When any one or all of the positions designated by $Y_1$, $Y_2$, $Y_3$ or $Y_4$ are alkyl radicals, in preferred embodiments, the alkyl radicals have from about 1 to about 4 carbon atoms. Furthermore, the alkyl radicals or fluorinated alkyl radicals represented by R or R' or by $Y_1$, $Y_2$, $Y_3$ and $Y_4$ may be straight chain or branched chain or mixtures thereof.

It will be noted that when the methylene carbon atom positioned between the phenol rings has one hydrogen atom, there is little or no steric hindrance in the molecule. Therefore, various position isomers of the fluorinated diphenol structures or mixtures thereof can be used in preparing the flame-retardant polyester-carbonate copolymers of the present invention. Thus, various position isomers of the fluorinated diphenols of formula (5) are possible; however, in most cases the isomers are mainly ortho and para, that is, the hydroxy groups are in the ortho and para positions relative to the methylene carbon atom positioned between the two phenol rings. In the most preferred embodiments, the isomer is the para isomer used in conjunction with carbonate precursors, difunctional carboxylic monomers and optionally other diphenols to form polyester-carbonate copolymers in accordance with the present invention.

Typical examples of fluorinated diphenols which may be used to make the flame-retardant polyester-carbonate copolymer compositions include, for example, 4,4'-

(2,2,2-trifluoroethylidene)diphenol, 4,4'-(2,2-difluoroethylidene)diphenol, 4,4'-(pentafluoropropylidene)diphenol, 2,4'-(2,2,2-trifluoroethylidene)diphenol, 2,2'-(pentafluoropropylidene)diphenol, 4,4'-(perfluorooctylidene)diphenol, 4,4'-(perfluorodecylidene)diphenol, 4,4'-(octafluorobutylidene)diphenol, and the like, including various combinations of fluorinated alkyl groups ranging from about 1 to about 23 carbon atoms, wherein R in the foregoing equations (3) and (5) represents from about 1 to about 22 carbon atoms. In the foregoing list of diphenols, the complete alkyl group is about 2 to about 23 carbon atoms when the methylene carbon atom located between the phenol rings is included in the alkyl group. Naturally, in the preparation of the flame-retardant copolyester-carbonates, any mixture of the fluorinated diphenols may be used in conjunction with the carbonate precursor, the difunctional carboxylic monomer or monomers and, optionally, other diphenols, to form a polyester-carbonate made from mixed fluorinated diphenols.

The fluorinated diphenols may be obtained from any source or by any synthetic method. Fluorinated diphenols may be made in accordance with the teachings of U.S. Pat. No. 3,388,097 where bisphenols are prepared by the hydrogen fluoride catalyzed condensation of an appropriate halogenated aldehyde or ketone with 2 molecules of an appropriate phenol in a pressurized vessel with hydrogen fluoride catalyst. Some of the fluorinated diphenols used in the present invention are disclosed in the prior art cited above and are the subject of two or our copending patent applications filed herewith and assigned to the instant assignee.

The polyester-carbonate copolymer compositions of this invention comprise copolymers containing structural units derived from at least one fluorinated diphenol of formula (5) as defined above, a carbonate precursor, at least one difunctional carboxylic monomer, such as a dicarboxylic acid halide or a dicarboxylic acid itself. The desired units occur in various manners in the copolymer chain. The polymers are linear and may be of any type including copolymers having alternating recurring units, random type wherein the structural units derived from the monomers are propagated along the copolymer chain in a random fashion; random block type wherein the units making up the copolymer are randomly arranged, but at least one of the unit structures is polymeric in nature; block-block type in which the structural units derived from the various components are polymeric in and of themselves; and the like.

The amount of fluorinated diphenol monomer required in the polyester-carbonate copolymers of the present invention is a sufficient amount in the composition to impart the desired flame resistance. Generally as low as about 1% by weight of the fluorinated diphenol monomer may be present in the polyester-carbonate copolymer to provide compositions having improved properties. Alternatively, when used in a blend, as low as about 1% by weight of the fluorinated diphenol monomer is required to achieve an improvement in polymer properties.

Other diphenols can also be used in conjunction with the fluorinated diphenol monomers of the present invention.

In accordance with the present invention, the polyester-carbonate copolymer compositions having improved flame retardance comprise bisphenol-carbonate units, the bisphenol portions of which are derived from:

(a) at least one fluorinated bisphenol having the general formula:

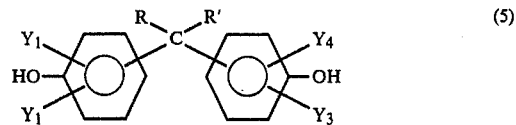

and (b) at least one non-fluorinated bisphenol having the general formula:

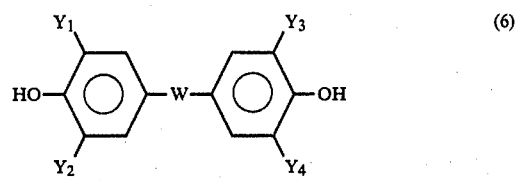

wherein R, R', $Y_1$, $Y_2$, $Y_3$ and $Y_4$ are the same as defined above, and W is selected from the group consisting of $C_1$–$C_9$ alkylene, $C_2$–$C_9$ alkylidene, $C_5$–$C_{15}$ cycloalkylene, $C_5$–$C_{15}$ cycloalkylidene, a single bond, —O—, —S—, —SO—, —SO$_2$— and —CO—.

As indicated above, as long as there is a sufficient amount of the fluorinated diphenol of formula (5) above, as a monomer to impart flame retardancy to the polyester-carbonate polymers of the present invention, other dihydric monomers of co-monomers such as dihydric phenols, can be employed in the practice of this invention. They include such bisphenols as bis(4-hydroxyphenyl)methane, 2,2-bis(4-hydroxy-3-methylphenyl)propane known as bisphenol-A (BPA), 2,2-bis(4-hydroxy-phenyl)propane, 4,4-bis(4-hydroxyphenylheptane, 2,2-bis(4-hydroxy-3,5-dichlorophenyl)-propane, 2,2-bis(4-hydroxy-3,5-dibromophenyl)propane, and the like; dihydric phenol ethers such as bis(4-hydroxyphenyl)ether, bis(3,5-dichloro-4-hydroxyphenyl)ether, and the like; dihydroxydiphenyls such as p,p'-dihydroxydiphenyl, 3,3'-dichloro-4,4-dihydroxydiphenyl, and the like; dihydroxyaryl sulfones such as bis(4-hydroxyphenyl)sulfone, bis(3,5-dimethyl-4-hydroxyphenyl)sulfone, and the like; dihydroxy benzenes, resorcinol, hydroquinone, halo- and alkyl-substituted dihydroxy benzenes, such as 1,4-dihydroxy-2,5-dichlorobenzene, 1,4-dihydroxy-3-methyl-benzene, and the like; and dihydroxy diphenyl sulfoxides such as bis(4-hydroxyphenyl)sulfoxide, bis(3,5-dibromo-4-hydroxyphenyl)sulfoxide, and the like. A variety of additional dihydric phenols are also available including those disclosed in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane, 2,2-bis(3,5-dibromo-4-hydroxy-phenyl)propane, and the like. It is also possible to employ two or more different dihydric phenols or a copolymer of a dihydric phenol with a glycol or with hydroxy or acid terminated polyester, or with a dibasic acid as well as blends of any of the above materials. Polymeric derivatives of a dihydric phenol, a dicarboxylic acid and carbonic acid as disclosed in U.S. Pat. No. 3,169,121 may also be used to make the copolyester-carbonates of the invention as long as there is sufficient fluorinated diphenol monomer of Formula (5) in the copolymer to impart flame retardance.

The carbonate precursor employed can be either a carbonyl halide, a carbonate ester or a haloformate depending upon the polymerization process used to make the polyester-carbonate copolymer of the invention. The carbonyl halides which can be employed, are carbonyl bromide, carbonyl chloride and mixtures thereof. Typical of the carbonate esters which can be employed, are diphenyl carbonate, di-(halophenyl)carbonates such as, di-(trichlorophenyl)carbonate, di-(tribromophenyl)carbonate and the like; di-(alkylphenyl)-carbonate such as di-(tolyl)carbonate, and the like; di-(naphthyl)carbonate, di-(chloronaphthyl)carbonate, phenyl tolyl carbonate, chlorophenyl chloronaphthyl carbonate, and the like, or mixtures thereof. The haloformates suitable for use herein include bishaloformates of dihydric phenols (bischloroformates of hydroquinone, and the like) or glycols (bishaloformates of ethylene glycol, neopentyl glycol, polyethylene glycol, and the like). While other carbonate precursors will occur to those skilled in the art, carbonyl chloride, also known as phosgene, is preferred. The polyester precursor, otherwise defined in the polyester-carbonate copolymer composition as ester units, which have copolymerized with the bisphenol-carbonate units, can be derived, for example, from acid dihalides, dibasic acids and esters of dibasic acids, depending upon the particular process used to make the polyester-carbonate copolymers. As used herein, the bisphenol-carbonate unit in the bisphenol of Formula (5) condensed with the carbonate precursor, the formula of the bisphenol-carbonate unit being illustrated in Formula (3).

Suitable examples of aromatic dicarboxylic acids which can be used, are phthalic, isophthalic, terephthalic and homophthalic; the polynulcear aromatic acids such as diphenic acid, and 1,4-naphthalic acid. Preferred acid dichlorides are isophthaloyl dichloride and terephthaloyl dichloride as well as mixtures thereof.

The polyester-carbonate copolymers of the present invention can be prepared by well-known processes such as by interfacial polymerization or phase boundary separation, transesterification, solution polymerization, interesterification, and the like. Various prior art polymerization processes are included in U.S. Pat. Nos. 3,030,331; 3,169,121, 3,207,814 and 4,188,314. Although the processes vary, several of the processes typically include dissolving the reactant in a suitable solvent medium under controlled pH conditions and in the presence of a suitable catalyst and acid acceptor and then contacting these reactants with a carbonate precursor. A molecular weight regulator, that is, a chain stopper, is generally added to the reactants prior to contacting them with a carbonate precursor. The useful molecular weight regulators include monohydric phenols, such as phenol, chroman-I, para-tertiarybutylphenol, para-bromophenol, and the like. Preferably, phenol is employed as the molecular weight regulator. Techniques for the control of molecular weight are well-known in the prior art and may be used in the present process for controlling the molecular weight of the polyester-carbonate copolymer compositions. In certain preferred embodiments, the number of recurring monomeric units in the polymer chain may be about 50 to about 100 or higher, depending upon the desired properties and use.

The acid acceptor employed can be either an organic or an inorganic acid acceptor. A suitable organic acid acceptor, for example, is a tertiary amine and includes such materials as pyridine, triethylamine, dimethylaniline, tributylamine, and the like. The inorganic acid acceptor, for example, can be one which can be either a hydroxide, a carbonate, a bicarbonate, or a phosphate of an alkali or alkaline earth metal.

The catalysts which can be employed, can be any of the suitable catalysts that aid the polymerization of the fluorinated diphenol of Formula (5) above, other dihydric compounds optionally present, and the acid dichloride or dibasic acid with the carbonate precursor. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, tetramethylammonium chloride and quaternary phosphonium compounds such as n-butyl-triphenyl phosphonium bromide and methyltriphenyl phosphonium bromide.

The solvent system employed depends upon the reactants (monomers) and the particular mode of polymerization. Generally, the solvent system is one in which the reactants can be accepted but which is inert with respect to the reactants. For example, an aqueous organic solvent system can be employed wherein the organic member can readily accept the reactants, but be inert to them. Exemplary of such organic members are methylene chloride, chlorobenzene, cyclohexanone, carbon tetrachloride, and the like. Preferably, the organic portion of the solvent system is methylene chloride, or it is possible to carry out the polymerization reaction in a solvent which itself is an acid acceptor, such as, pyridine.

Also included herein are branched copolyester-carbonates wherein a polyfunctional aromatic compound is reacted with the fluorinated diphenol of Formula (5) and/or other dihydric compounds, such as those of Formula (6), in the reaction mixture, the carbonate precursor and the polyester precursor, such as the acid dichloride, to provide a thermoplastic randomly branched copolyester-carbonate. These polyfunctional aromatic compounds contain at least three functional groups which are carboxyl, carboxylic anhydride, carboxylic halide or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their haloformyl derivatives.

The proportion of carboxylate and carbonate groups present in the polyester-carbonate copolymer compositions of the present invention is not critical and can be suitably varied by varying the molar ratio of the fluorinated diphenol and/or other dihydric compounds to difunctional polyester precursor, such as difunctional carboxylic acids or difunctional acid halides. In the preparation of the copolyester-carbonate copolymer compositions of the present invention, the fluorinated diphenol and optionally other dihydric compounds, the carbonate precursor, and the polyester precursor can be varied depending upon the desired product and depending upon the desired flame rating for the molded products, extruded products, films and other products made from the polyester-carbonate copolymer compositions.

Other well-known materials can also be employed for their intended function and include such materials as anti-static agents, mold release agents, thermal stabilizers, ultraviolet light stabilizers, reinforcing fillers such as glass and other inert fillers, foaming agents, and the like.

In accordance with the present invention, blends or mixtures of the polyester-carbonate copolymer compositions can also be made with homopolymers, copolymers, mixed homopolymers, mixed copolymers, or mixed homopolymers/copolymers, block copolymers and the like. It is possible to mix or blend the high molecular weight polyester-carbonate copolymer compositions of matter having improved flame resistance with conventional aromatic polycarbonates, with polyarylates, including polyesters, and with conventional copolyester carbonates to obtain improved flame-retardant properties of the conventional resins. They can be blended as desired to obtain the desired V rating per UL-94 for any particular polycarbonate, polyarylate, including polyesters, copolyester-carbonate, and the like. The polyester-carbonate copolymers of the present invention having polycarbonate units comprising fluorinated diphenol structures, may be blended with linear aromatic polycarbonates, branched aromatic polycarbonates, mixtures of linear and branched aromatic polycarbonates, linear polyesters, branched polyesters, mixtures of linear and branched polyesters, linear polyester-carbonates, branched polyester-carbonates, mixtures of linear and branched polyester-carbonates, and the like. Naturally, such polyarylates, polycarbonates and the like can also be blended together with the polyester-carbonate copolymer compositions of the present invention.

As indicated above, the polyester-carbonate copolymer compositions of the present invention can be mixed or blended with various other polymeric materials to achieve various flame ratings as desired for molded products, extruded products, films, and the like. Thus, by mixing, for example, monomers of the fluorinated diphenols and, for example, bisphenol-A with a carbonate precursor and a polyester precursor, such as a diacid halide, and forming a polyester-carbonate copolymer composition in accordance with the present invention, the polyester-carbonate composition can be designed to fall within any of the various burning test ratings, such as, V-O, V-I or V-II. The same result can be achieved by mixing or blending various polymers, one of which must be polyester-carbonate copolymer composition of the present invention. The blending or copolymerization may also change the glass transition temperature (Tg) or heat distortion temperature of the polymers which in turn determines the practical temperature range at which articles made from the polymeric composition can be used.

The following examples are set forth to more fully and clearly illustrate the present invention and are intended to be, and should be construed as being, exemplary and not limitative of the invention. Unless otherwise stated, all parts and percentages are by weight.

EXAMPLE 1

To a ten gallon reactor vessel was added 1938 g (8.5 moles) of BPA, 7 liters of methylene chloride, 5.5l of water, 14 ml (1 mole %) of triethylamine, 3.4 g of sodium gluconate and 28 g (3.0 mole %) of phenol. At pH 9-10, 304 g (1.5 moles) of isophthaloyl dichloride (IPCl$_2$) in one liter of methylene chloride was added over a 3 minute period while controlling the pH with 35% aqueous caustic. The pH was lowered to 5-6, and then phosgene was delivered at 36 g/min. for 5 minutes. The pH was adjusted to 11, and phosgenation continued at 36 g/min. for 22 minutes while controlling the pH at 11 with 35% aqueous caustic. The solution was diluted with 7 liters of methylene chloride, and the phases separated. The methylene chloride-polymer phase was washed with 0.01 N HCl, and 3 times with water (standard workup procedure). The resin was precipitated with steam to yield a white powder which was dried at 95° C. in a nitrogen purged fluid bed dryer. The copolyester-carbonate resin obtained had an intrinsic viscosity in methylene chloride at 25° C. of 0.48 dl/g. and had a BPA:IPCL$_2$: carbonate molar ratio of about 2.0:0.35:1.65. The resin was stabilized with standard stabilizing amounts of a phosphite and an epoxide as disclosed in German Pat. No. 1,694,285. This resin product was then fed to an extruder operating at a temperature of about 265° C. (600° F.) to extrude the resin into strands and the extruded strands were chopped into pellets.

The pellets were then injection molded at about 315° C. (620° F.) into test bars of about 5 in. by ½ in. by about ⅛ in. thick and into stepped test squares of about 2 in. by 2 in. by about ⅛ in. and 1/16 in. thick. The ⅛ in. test bars (5 for each test result shown in the Table) were subjected to the flame-retardancy test procedure set forth in Underwriter's Laboratores, Inc. Bulletin UL-94, Burning Test for Classifying Materials. In accordance with this test procedure, materials that pass the test are rated either V-O, V-I or V-II based on the results of 5 specimen. The criteria for each V (for vertical) rating per UL-94 is briefly as follows:

"V-O": Average flaming and/or glowing after removal of the igniting flame shall not exceed 5 seconds and none of the specimen shall drip flaming particles which ignite absorbent cotton.

"V-I": Average flaming and/or glowing after removal of the igniting flame shall not exceed 25 seconds and the glowing does not travel vertically for more than 1″ of the specimen after flaming ceases and glowing is incapable of igniting absorbent cotton.

"VII": Average flaming and/or glowing after removal of the igniting flame shall not exceed 25 seconds and the specimen drip flaming particles which ignite absorbent cotton.

In addition, a test bar which continues to burn for more than 25 seconds after removal of the igniting flame is classified, not by UL-94, but by the standards of the invention, as "burns". Further, UL-94 requires that all test bars in each test group must meet the V-type rating to achieve the particular classification; otherwise, the 5 bars receive the rating of the worst single bar. For example if one bar is classified as V-II and the other four (4) are classified as V-O, then the rating for all bars is V-II.

Impact measurements by the notched Izod test were determined pursuant to ASTM D-256 on ⅛ in. thick test bars.

EXAMPLE 2

The procedure of Example 1 was exactly repeated, except that about half of the BPA 4.0 moles (912.0 g) was replaced with 1072 g (4.0 moles) of 4,4'-(1H-trifluoroethylidene)bisphenol. The colorless, transparent molded parts, made from the copolyester polycarbonate were evaluated by the Underwriters Laboratories Bulletin-94 test and were found to have a V-O rating.

EXAMPLE 3

The procedure of Example 1 was repeated, except that all of the 4,4'-isopropylidenediphenol was replaced by 2280 g (8.5 moles) of 4,4'-(IH-trifluoroethylidene) bisphenol. The colorless, transparent molded parts made from the polycarbonate ester possessed high impact and a V-O rating in the flammability test.

EXAMPLE 4

Repeating Example 2 with 2272 g (4.0 moles) of 4,4'-(1H-1,1-perfluorooctylidene)bisphenol in place of the 4,4'-(1H-trifluoroethylidene)bisphenol yielded a copolyester-carbonate composition which yielded tough, colorless, transparent molded parts that were V-O by the Bulletin-94 test.

EXAMPLE 5

When the procedure of Example 1 was repeated with 1352 g (4.0 moles) of 4,4'-(1-trifluoromethyltrifluoroethylidene)-bis-phenol in place of 4.0 moles of BPA and 101.7 g of terephthaloyl dichloride in place of the same amount of isophthaloyl dichloride there was obtained a tough, transparent copolyestercarbonate with a V-O rating by the Bulletin-94 test.

EXAMPLE 6

Repeating the procedure of Example 1 with 1692 g (6.0 moles) of 4,4'-(1-methyltrifluoroethylidene)bisphenol in place of the same moles of BPA yielded a tough, colorless, transparent copolyestercarbonate, a flame resistance of V-O rating by the Bulletin 94 test.

While the invention has been described with respect to preferred embodiments, it will be apparent that certain modifications and changes can be made without departing from the spirit and scope of the invention and, therefore, it is intended that the foregoing disclosure be limited only by the claims appended hereto.

What is claimed is:

1. A high molecular weight polyester-carbonate copolymer composition of matter having improved flame resistance comprising bisphenol ester units and bisphenol-carbonate units, said bisphenol-carbonate units having the general formula:

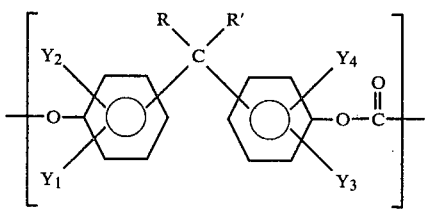

wherein R is selected from the group consisting of a fluorinated alkyl radical and a fluorinated aryl radical; R' is selected from the group consisting of fluorinated alkyl radical, fluorinated aryl radical, alkyl radical and hydrogen; and $Y_1$, $Y_2$, $Y_3$ and $Y_4$ are each independently selected from the group consisting of hydrogen, alkyl radical, chlorine and bromine.

2. The high molecular weight polyester-carbonate copolymer of claim 1 wherein R is a straight chain or branched fluorinated alkyl radical.

3. The high molecular weight polyester-carbonate copolymer of claim 1, wherein R is a fluorinated alkyl radical having from 1 to about 22 carbon atoms.

4. The high molecular weight polyester-carbonate copolymer of claims 1, 2 or 3, wherein R is a perfluorinated alkyl radical.

5. The high molecular weight polyester-carbonate copolymer of claim 1, wherein R is a fluorinated aryl radical having from 6 to about 16 carbon atoms.

6. The high molecular weight polyester-carbonate copolymer of claim 1, wherein R is a perfluorinated aryl radical.

7. The high molecular weight polyestercarbonate of claim 1, wherein R' is an alkyl radical having from 1 to about 6 carbon atoms.

8. The high molecular weight polyestercarbonate of claim 1 wherein R' is a fluorinated aryl radical having from 6 to about 16 carbon atoms.

9. The high molecular weight polyester-carbonate of claim 1 wherein R' is a fluorinated alkyl radical having from 1 to about 22 carbon atoms.

10. The high molecular weight polyester-carbonate copolymer of claim 1 wherein the alkyl radical of $Y_1$, $Y_2$, $Y_3$ or $Y_4$ is from about 1 to about 4 carbon atoms.

11. The high molecular weight polyester-carbonate copolymer of claim 1, wherein the bisphenol ester units have the general formula:

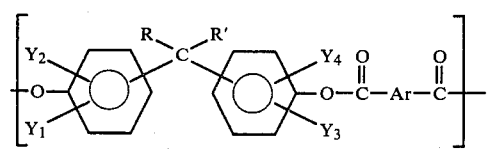

wherein Ar is selected from the group consisting of meta-phenylene, meta-phenylene having halogen or monovalent lower alkyl groups thereon, para-phenylene and para-phenylene having halogen or monovalent lower alkyl groups thereon, and R, R', $Y_1$, $Y_2$, $Y_3$ and $Y_4$ are defined in claim 1.

12. The high molecular weight polyester-carbonate copolymer of claim 11, wherein Ar is:

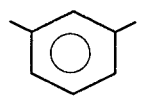

13. The high molecular weight polyester-carbonate copolymer of claim 11, wherein Ar is:

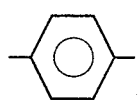

14. The high molecular weight polyester-carbonate copolymer of claim 1, further comprising recurring units derived from at least one non-fluorinated bisphenol having the general formula:

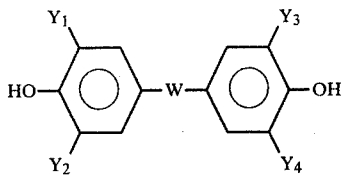

wherein $Y_1$, $Y_2$, $Y_3$ and $Y_4$ are defined in claim 1, and W is selected from the group consisting of $C_1$–$C_9$ alkylene, $C_2$–$C_9$ alkylidene, $C_5$–$C_{15}$ cycloalkylene, $C_5$–$C_{15}$ cycloalkylidene, a single bond, —O—, —S—, —SO—, —SO$_2$— and —CO—.

15. The high molecular weight polyester-carbonate copolymer of claim 14 wherein the non-fluorinated bisphenol is 4,4'-isopropylidenediphenol.

16. The high molecular weight polyester-carbonate copolymer of claims 1, 11 or 14 wherein the aromatic polyester units and the aromatic polycarbonate units occur in random-block order.

17. The high molecular weight polyester-carbonate copolymer of claim 1 wherein the fluorinated bisphenol is 4,4'-(1-methyltrifluoroethylidene)bisphenol.

18. The high molecular weight polyester-carbonate copolymer of claim 1 wherein the fluorinated bisphenol is 4,4'-(1H-trifluoroethylidene)bisphenol.

19. The high molecular weight polyester-carbonate copolymer of claim 1 wherein the fluorinated bisphenol is 4,4'-(1-trifluoromethyltrifluoroethylidene)bisphenol.

20. The high molecular weight polyester-carbonate copolymer of claim 1, further comprising a blend with a polyester.

* * * * *

UNITED STATES PATENT AND TRADEMARK OFFICE
CERTIFICATE OF CORRECTION

PATENT NO.   : 4,349,658
DATED        : September 14, 1982
INVENTOR(S)  : Victor Mark and Charles Vernon Hedges It is certified that error appears in the above-identified patent and that said Letters Patent is hereby corrected as shown below:

Column 3, line 21, structure shows "$R_1$" should be --$Y_1$--.

Signed and Sealed this

Sixth Day of March 1984

[SEAL]

Attest:

GERALD J. MOSSINGHOFF

Attesting Officer

Commissioner of Patents and Trademarks